7941X
S. A. Sweet.
Pulp Strainer.
No.
Patented Dec. 31, 1833.
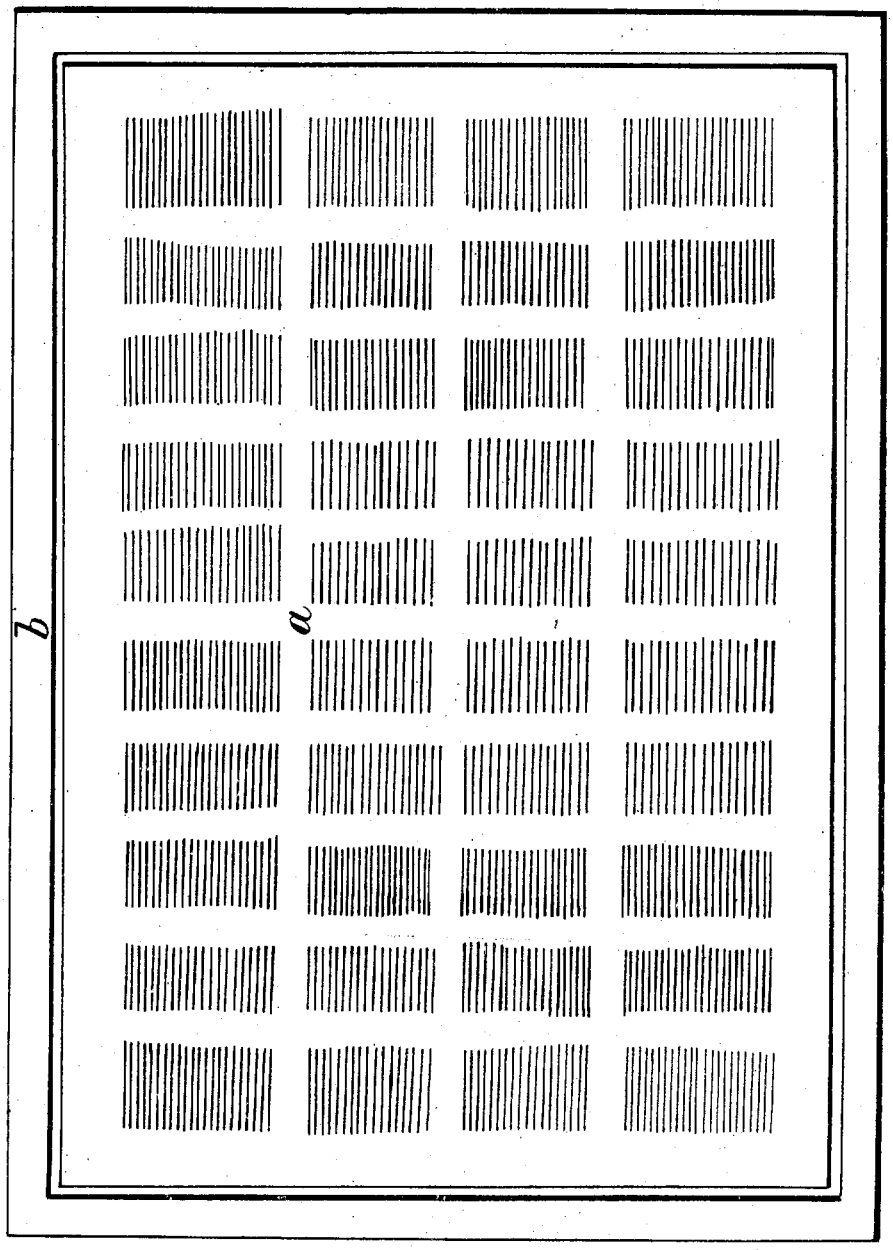

159 7941X Dec. 31, 1833 449

Sidney A Sweet, Tyringham, Massachusetts
Letters Patent.

Dated December 31st 1833.

The Schedule referred to in these Letters Patent, and making part of the same, containing a description in the words of the said Sidney A. Sweet himself, of his improvement called the Horizontal Pulp Sifter.

---

Be it known, that I, Sidney A. Sweet, of Tyringham, in the County of Berkshire, and State of Massachusetts, have made a new and useful improvement in the useful art, called the Horizontal Pulp Sifter, which is described as follows; reference being had to the annexed drawing.

This Pulp Sifter consists of a metallic plate, a, having incisions or fine slits made thro' the same to permit the passage of the pulp; which slits should be sufficiently narrow to detain the knots, and other impurities, usually floating or formed therein. The plate is surrounded by a border or frame of wood, b, so high as to prevent the overflow of the pulp. This pulp sifter should be placed horizontally in a situation convenient for receiving the pulp after its mixture with water, the pulp having passed through the sifter should be carried to the vat where it is to be used. The operation or manner of forcing the pulp through the pulp sifter is by a jarring motion produced by elevating the same, or one or both ends of it, a small distance and then suffering it again to fall suddenly upon some solid fixture. This motion should be rapidly repeated, and may be produced by many and various ways already known.

What I claim as my invention is the before described manner of constructing the Horizontal Pulp Sifter and the mode of operating it for sifting or dressing pulp for the manufacture of paper

Witnesses
William P. Elliot
Robt. Clarke

Sidney A Sweet 27 words

Dr. in portfolio